United States Statutory Invention Registration [19]

[11] Reg. Number: H349

Krevitz et al. [43] Published: Oct. 6, 1987

[54] INERT SOLID COMPOSITIONS WHICH BECOME CHEMICALLY REACTIVE WHEN MOLTEN

[75] Inventors: Kenneth Krevitz; Louis L. Pytlewski, both of Philadelphia; Charles T. Davey, Dresher, all of Pa.

[73] Assignee: The United States of America as represented by the Secretary of the Army, Washington, D.C.

[21] Appl. No.: 25,123

[22] Filed: Mar. 12, 1987

[51] Int. Cl.[4] ..... A62D 1/00; C08L 91/06; D21D 3/00

[52] U.S. Cl. ..... 252/7; 252/2; 252/186.2; 252/189; 252/192; 252/193; 106/230; 162/159; 149/124

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

A reagent composition which is chemically inert when solid and is chemically reactive when molten comprises a first substance selected from high molecular weight waxes and polymers and a second substance dissolved, dispersed, or encapsulated in the first substance. The second substance is highly chemically reactive and is selected from strong bases and strong acids. The composition is particularly adapted for use in safety devices automatically activated in response to an increase in the temperature of a chemical system and in processes for automatically discontinuing the operation of or decontaminating the products of a malfunctioning chemical system.

36 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INERT SOLID COMPOSITIONS WHICH BECOME CHEMICALLY REACTIVE WHEN MOLTEN

The invention described herein may be manufactured, used and licensed by or for the Government for Governmental purposes without the payment to us of any royalties thereon.

FIELD OF THE INVENTION

The present invention relates to reagent compositions which are chemically inert when solid and chemically reactive when molten. The invention also relates to safety devices including the reagent compositions and to safety processes using the reagent compositions.

BACKGROUND OF THE INVENTION

Various electrical and mechanical safety systems are known for responding to abnormal conditions such as a fire in an industrial, business or residential area or an uncontrolled chemical process in a chemical plant. However, many of the known electrical and/or mechanical systems require extensive alarms and controls for activation and operation. Many systems require either human activation of the system or human operation of at least a portion of the system in order to adequately respond to abnormal conditions such as a fire. Thus, the need exists for a safety system which is independent of human activation and operation and which does not require extensive alarms, circuits and controls.

SUMMARY OF THE INVENTION

Accordingly, it is an object of the present invention to provide a safety system which is independent of human, electrical and mechanical means for activation and operation. It is an additional objective of the invention to provide a safety device which may automatically be activated in response to an increase in the temperature of a chemical system. It is a related object to also provide processes for automatically discontinuing the operation of and decontaminating the products of a malfunctioning chemical system. For example, the device and method of the present invention may be employed to automatically extinguish a fire or interrupt an uncontrolled chemical reaction.

These and additional objects and advantages are provided by the reagent compositions according to the present invention which are chemically inert when solid and are chemically reactive when molten. More particularly, the reagent compositions of the present invention may comprise a first substance such as a high molecular weight wax or polymer and a second substance which is dissolved, dispersed, or encapsulated in a solid matrix of the first substance. The second substance is a highly chemically reactive compound such as a strong base or a strong acid. As solids, these reagent compositions are chemically inert, but when molten, the second substance is exposed and the resultant liquid solutions are very reactive.

The present invention also relates to safety devices including the reagent compositions of the present invention. The safety devices according to the present invention are adapted for use in connection with various chemical systems, for example chemical reaction vessels, chemically reacting systems such as explosives and pyrotechnic devices, industrial chemical processes, flammable materials and the like, and the safety devices are automatically activated in response to an increase in the temperature of the chemical system from a lower normal temperature to a higher abnormal operating temperature.

These safety devices are made of the reagent compositions according to the present invention. Thus, the reagent composition is adapted to react with either the chemical system or any toxic products resulting from the abnormal operation of the chemical systems in order to discontinue the abnormal operation or to decontaminate any toxic products resulting from the operation. Since the safety device is automatically activated in response to an increase in the temperature of the chemical system, the safety devices according to the present invention are free from human, electrical or mechanical activation or operation.

Similarly, the present invention relates to processes for automatically interrupting or discontinuing an abnormal operation of the chemical system in response to an increase in the temperature of the chemical system from a lower normal temperature to a higher abnormal operating temperature. The present invention also relates to processes for automatically decontaminating any toxic products resulting from the abnormal operation of a chemical system in response to an increase in the temperature of the chemical system. These processes comprise exposing the chemical system to a safety device including the reagent composition of the present invention.

Additional objects and advantages of the present invention will become apparent from the following detailed description of the invention.

DETAILED DESCRIPTION OF THE INVENTION

The present invention thus relates to reagent compositions which are chemically inert when solid and are chemically reactive when molten. The novel reagent compositions according to the present invention may include a first substance preferably selected from high molecular weight waxes and polymers and a second substance which is dissolved, dispersed, or encapsulated in a solid matrix of the first substance. The second substance is highly chemically reactive and is preferably selected from the strong bases and strong acids. In the solid state, the reagent compositions according to the invention are chemically inert. However, when the compositions become molten, a reactive solution is exposed for chemical reaction with the surrounding environment.

For example, the reactive second substance may comprise a single compound such as an alkali or alkaline earth metal salt (Li, Na, K, Mg and Ca salts are preferred) of a high molecuar weight alcohol, diol, polyol, polyglycol, polyglycol ether and the like, or mixtures thereof. Preferred second substances, also include alcoholates, oxides and hydroxides of Li, Na, K, Mg and Ca, and other alkali and alkaline earth metals.

The reagent compositions in the solid state are added to or interfaced with a solid chemical system which requires chemical decomposition or deactivation upon abnormal operation. The two solid systems are combined as a granular mix or other solid-solid interface. As long as the temperature of the chemical system remains at a lower, normal temperature, the reagent composition according to the present invention remains solid and does not react with the chemical system. However, when the temperature of the chemical system rises to an abnormal operating or reaction temperature, for example, in the case of a fire or an uncontrolled chemical reaction, the reagent composition melts and exposes a reactive liquid to the chemical system. The two-substance reagent composition, as described, exposes a solution of the second substance in the first substance for reaction with the chemical system. The reaction may serve to discontinue the abnormal operation of the chemical system, for example to extinguish a fire or interrupt or quench an uncontrolled chemical reaction, or the reaction between the reagent composition and the chemical system may serve to decontaminate or decompose any toxic or dangerous materials resulting from the abnormal operation of the chemical system.

The first substance is preferably a high molecular weight wax or a polymer or mixtures thereof. The wax or polymer is selected in view of the chemical system with which the reagent composition is to be used so that the melting point of the reagent composition will be above the normal operating temperature of the chemical system and below the abnormal operating temperature of the chemical system. It is also desired that the chemical system is soluble in the molten reagent composition solution.

The reagent composition has a melting point above room temperature, i.e., above 25° to 30° C., and depending on the chemical system with which the composition is used, the melting point may be as high as 350°–400° C. Most preferably, the melting point of the reagent composition is in the range of about 30° C. to about 250° C.

The first substance may comprise, for example, high molecular weight paraffin waxes or polymers, alcohols, diols, polyols, polyglycols or polyglycol ethers, and may contain up to 25 weight percent of a phase transfer catalyst which is a quaternary ammonium or phosphonium salt.

The reagent composition according to the present invention is particularly adapted for use in safety devices automatically activated in response to an increase in the temperature of a chemical system. For example, when the temperature of a chemical system rises from a lower normal temperature to a higher abnormal operating temperature, a safety device which is made of the reagent composition of the present invention is automatically activated. That is, in response to the rise in temperature, the reagent composition is melted and exposes the second substance for chemical reaction with the chemical system. The safety devices according to the present invention may be used in various forms compatible with various different chemical systems.

For example, a safety device made of the present reagent composition may be in the form of an impregnate which is included in a porous material contained in a chemical system. Specifically, the reagent composition may be impregnated in a covering paper, cloth or fabric such as wallpaper or other porous material whereby if the porous material is on fire or exposed to high temperatures which might cause ignition and burning of the material, the safety device comprising the present reagent composition is automatically activated in response to the increase in the temperature of the porous material so that the reagent composition is melted and is exposed for chemical reaction. The reaction may serve to extinguish the fire or to decontaminate any toxic products produced by the combustion of the porous material.

Alternatively, the safety device may be in the form of a coating on at least a portion of a chemical system, for example on explosive material, fuses, blasting caps or pyrotechnic mixes. In response to an increase in the temperature of such a chemical system, the reagent composition melts to form a highly reactive liquid or solution. The molten reagent composition reacts to deactivate the explosive or pyrotechnic device. Additionally, the safety device may be in the form of a coating used to line the walls of a reaction vessel whereby if a chemical reaction temperature increases to an unexpectedly or unusually high temperature, for example when a chemical reaction process is out of control, the reagent composition melts to form a reactive liquid which may interrupt or discontinue the chemical reaction.

An important feature of the safety device of the present invention is that the molten reagent composition may also be chemically reactive with toxic products resulting from the abnormal operation of the chemical system in order to decontaminate or decompose the toxic products.

In additional embodiments, the safety device of the invention may be arranged adjacent or may be contained within a chemical system and is automatically activated in response to an increase in the temperature of the chemical system to an abnormally high temperature.

The safety devices according to the present invention may be used to automatically discontinue an abnormal operation of a chemical system or to automatically decontaminate toxic products resulting from the abnormal operation of the chemical system. For example, the safety device may be used to automatically extinguish a fire or to decompose or decontaminate combustion products resulting from burned materials. The reagent composition according to the present invention provides a built-in unattended safety system which becomes operative only when a particular temperature is exceeded. The safety devices and processes according to the invention are independent of human, electrical or mechanical activation or operation.

The following examples demonstrate the reagent compositions, safety devices and processes according to the present invention.

EXAMPLE 1

A reagent composition according to the present invention was prepared by mixing together 100 ml of molten Carbowax 600 and 20 grams of NaOH. 5 grams of TBAS were also added. The mixture was allowed to resolidify to form the reagent composition. A chemical system was prepared by mixing 5 grams methylisopropylphenylglycolate (MIPG) with 100 ml of melted paraffin wax. The resultant mixture was allowed to resolidify. The solid reagent composition and the solid chemical system were finally ground together in a blender. The air space above the resultant solid mixture was sampled for $CH_3OH$. No $CH_3OH$ was initially detected. The solid mixture was then gradually heated and intermittently sampled. No $CH_3OH$ was detected until the solid mix was molten at approximately 70° C. at which point the $CH_3OH$ concentration in the air space above the sample was determined by gas chromatography to be about 20,000 ppm. This example was repeated except that 5 grams of potassium chlorate oxidant ($KClO_3$) was also added to the reagent composition. The potassium chlorate oxidant appeared to be insoluble in the molten Carbowax 600 and had no effect on the reaction.

EXAMPLE 2

A reagent composition according to the present invention was prepared comprising 100 grams of solid octadecanol and 2 grams of NaOH. The composition was heated to a temperature of about 82° C. at which point a clear, yellow liquid was produced. In order to determine the reactivity of the reagent composition, 1 gram of MIPG was added to the resultant melt with stirring. After one minute, a 1 ml aliquot was dissolved in 100 ml of $CH_3OH$ and analyzed by gas chromatography. No MIPG was observed in the experimental sample. Previously, a gas chromatogram of 1 gram of MIPG in 100 ml of $CH_3OH$ had been run and the MIPG retention time was established. To the same melt, 2 grams of MIPG were added and, again, after one minute the chromatogram indicated the complete decomposition of the MIPG. Subsequently, PTC, TBAS and $KClO_3$ were each added to the molten NaOH-octadecanol solution. Each were found to be neutral as to their potential chemical action.

An additional reagent composition was prepared by combining potassium hydroxide (KOH) and octadecanol. It was determined that KOH was more soluble or miscible with octadecanol than NaOH and molten octadecanol-KOH mixtures containing as much as 50 percent by weight KOH were produced. The remelted solid octadecanol-KOH mixtures exhibited an increase in melting point roughly as a linear function of the concentration of added KOH up to a maximum melting point increase of about 15° C. for a 50—50 percent by weight mixture. A reagent composition comprising KOH and 1,12-octadecandiol was also produced. While the diol has a melting point of 64° C., the 50—50 weight percent KOH-diol mixture exhibited a melting point of about 80° C.

EXAMPLE 3

Various chemical systems were produced in the form of compressed discs comprising (1) a pyrotechnic mix including a red dye (2) a mixture of MIPG and a pyrotechnic mix, and (3) a mixture of MIPG, a red dye and a pyrotechnic mix. A reagent composition according to the present invention was prepared as set forth in Example 2 containing 20 weight percent KOH and octadecanol as the remainder. A first sample of the reagent composition was heated to melting and a compressed disc of the mixture of MIPG and the pyrotechnic mix was added. The disc immediately took on a red-yellow color and disintegrated into small pieces. A gas chromatographic analysis indicated that the MIPG had been completely decomposed.

A compressed disc of the mixture of MIPG and the pyrotechnic mix was then interfaced with a compressed disc of the reagent composition according to the present invention containing 20 weight percent KOH and octadecanol to form a solid binary capsule system. The binary capsule was placed on a hot plate and heated to the melting point of the reagent composition. At 85° C., the reagent composition melted and the liquid immediately penetrated the compressed disc of the mixture of MIPG and the pyrotechnic mix. There was no evidence of the evolution of volatile substances, even when the system was further heated in excess of 400° C. This procedure was repeated using binary capsule systems formed from compressed discs of the reagent composition according to the present invention and each of the chemical systems described above. No particulate matter evolved from either of the systems.

The objects, advantages and embodiments set forth herein and in the exampes are illustrative only. Additional objects, advantages and embodiments within the scope of the present invention will be apparent to those of ordinary skill in the art.

What is claimed is:

1. A reagent composition which is chemically inert when solid and is chemically reactive when molten, comprising (a) a first substance selected from the group consisting of high molecular weight waxes and polymers; and (b) a second substance dissolved, dispersed, or encapsulated in a solid matrix of said first substance, said second substance being highly chemically reactive and selected from the group consisting of strong bases and strong acids, whereby when said reagent composition melts, said second substance is exposed for chemical reaction.

2. A reagent composition as defined by claim 1, wherein said first substance is selected from the group of compounds consisting of high molecular weight paraffin waxes, alcohols, diols, polyols, polyglycols and polyglycol ethers.

3. A reagent composition as defined by claim 2, wherein the first substance includes up to 25 weight percent of a phase transfer catalyst which is selected from quaternary ammonium and phosphonium salts.

4. A reagent composition as defined by claim 1, wherein said first substance has a melting point of from about 30° C. to about 250° C.

5. A reagent composition as defined by claim 1, wherein said second substance is an inorganic acid or base.

6. A reagent composition as defined by claim 1, wherein said second substance is selected from the group of compounds consisting of the oxides and hydroxides of Li, Na, K, Mg and Ca.

7. A reagent composition as defined by claim 1, wherein said second substance is selected from the group of compounds consisting of Li, Na, K, Mg and Ca salts of high molecular weight alcohols, diols, polyols, polyglycols and polyglycol ethers.

8. A reagent composition as defined by claim 1, wherein said second substance is selected from the group consisting of oxides, hydroxides and alcoholates of alkali metals and alkaline earth metals.

9. A safety device automatically activated in response to an increase in the temperature of a chemical system from a lower normal temperature to a higher abnormal operating temperature, said device being made of a reagent composition as defined in claim 1, whereby when the chemical system temperature increases to the higher abnormal temperature, said reagent composition melts and exposes said second substance for chemical reaction with the chemical system.

10. A safety device as defined by claim 9, wherein said first substance is selected from the group of compounds consisting of high molecular weight paraffin waxes, alcohols, diols, polyols, polyglycols and polyglycol ethers.

11. A safety device as defined by claim 10, wherein the first substance includes up to 25 weight percent of a phase transfer catalyst which is selected from quaternary ammonium and phosphonium salts.

12. A safety device as defined by claim 9, wherein said first substance has a melting point of from about 30° C. to about 250° C.

13. A safety device as defined by claim 9, wherein said second substance is an inorganic acid or base.

14. A safety device as defined by claim 9, wherein said second substance is selected from the group of compounds consisting of the oxides and hydroxides of Li, Na, K, Mg and Ca.

15. A safety device as defined by claim 9, wherein said second substance is selected from the group of compounds consisting of Li, Na, K, Mg and Ca salts of high molecular weight alcohols, diols, polyols, polyglycols and polyglycol ethers.

16. A safety device as defined by claim 9, wherein said second substance is selected from the group consisting of oxides, hydroxides and alcoholates of alkali metals and alkaline earth metals.

17. A safety device as defined by claim 9, wherein said device is impregnated into a porous material contained in the chemical system.

18. A safety device as defined by claim 9, wherein said device is in the form of a coating on at least a portion of the chemical system.

19. A safety device as defined by claim 9, wherein said device is arranged adjacent the chemical system.

20. A safety device as defined by claim 9, wherein said device is contained within the chemical system.

21. A process for automatically discontinuing an abnormal operation of a chemical system in response to an increase in the temperature of the chemical system from a lower normal temperature to a higher abnormal operating temperature, comprising exposing the chemical system to a safety device made of a reagent composition as defined by claim 1, whereby when the chemical system temperature increases to the higher abnormal temperature, said reagent composition melts and exposes said second substance for chemical reaction with the chemical system.

22. A process for automatically discontinuing an abnormal operation of a chemical system as defined by claim 21, wherein said first substance is selected from the group of compounds consisting of high molecular weight paraffin waxes, alcohols, diols, polyols, polyglycols and polyglycol ethers.

23. A process for automatically discontinuing an abnormal operation of a chemical system as defined by claim 22, wherein the first substance includes up to 25 weight percent of a phase transfer catalyst which is selected from quaternary ammonium and phosphonium salts.

24. A process for automatically discontinuing an abnormal operation of a chemical system as defined by claim 21, wherein said first substance has a melting point of from about 30° C. to about 250° C.

25. A process for automatically discontinuing an abnormal operation of a chemical system as defined by claim 21, wherein said second substance is an inorganic acid or base.

26. A process for automatically discontinuing an abnormal operation of a chemical system as defined by claim 21, wherein said second substance is selected from the group of compounds consisting of the oxides and hydroxides of Li, Na, K, Mg and Ca.

27. A process for automaticaly discontinuing an abnormal operation of a chemical system as defined by claim 21, wherein said second substance is selected from the group of compounds consisting of Li, Na, K, Mg and Ca salts of high molecular weight acohols, diols, polyols, polyglycols and polyglycol ethers.

28. A process for automatically discontinuing an abnormal operation of a chemical system as defined by claim 21, wherein said second substance is selected from the group consisting of oxides, hydroxides and alcoholates of alkali metals and alkaline earth metals.

29. A process for automatically decontaminating toxic products resulting from the abnormal operation of a chemical system in response to an increase in the temperature of the chemical system from a lower normal temperature to a higher abnormal operating temperature, comprising exposing the chemical system to a safety device made of a reagent composition as defined by claim 1, whereby when the chemical system temperature increases to the higher abnormal temperature, said reagent composition melts and exposes said second substance for chemical reaction with the chemical system.

30. A process for automatically decontaminating toxic products as defined by claim 29, wherein said first substance is selected from the group of compounds consisting of high molecular weight paraffin waxes, alcohols, diols, polyols, polygycols and polyglycol ethers.

31. A process for automatically decontaminating toxic products as defined by claim 30, wherein the first substance includes up to 25 weight percent of a phase transfer catalyst which is selected from quaternary ammonium and phosphonium salts.

32. A process for automatically decontaminating toxic products as defined by claim 29, wherein said first substance has a melting point of from about 30° C. to about 250° C.

33. A process for automatically decontaminating toxic products as defined by claim 29, wherein said second substance is an inorganic acid or base.

34. A process for automatically decontaminating toxic products as defined by claim 29, wherein said second substance is selected from the group of compounds consisting of the oxides and hydroxides of Li, Na, K, Mg and Ca.

35. A process for automatically decontaminating toxic products as defined by claim 29, wherein said second substance is selected from the group of compounds consisting of Li, Na, K, Mg and Ca salts of high molecular weight alcohols, diols, polyols, polyglycols and polyglycol ethers.

36. A process for automatically decontaminating toxic products as defined by claim 29, wherein said second substance is selected from the group consisting of oxides, hydroxides and alcoholates of alkali metals or alkaline earth metals.

* * * * *